United States Patent [19]

Seidner

[11] Patent Number: 5,024,517

[45] Date of Patent: Jun. 18, 1991

[54] MONOVISION CORNEAL CONTACT LENSES

[76] Inventor: Leonard Seidner, St. John's Pl., Brooklyn, N.Y. 11217

[21] Appl. No.: 447,201

[22] Filed: Dec. 7, 1989

[51] Int. Cl.$^5$ .............................................. G02C 7/04
[52] U.S. Cl. .................................................... 351/161
[58] Field of Search ............... 351/160 R, 160 H, 161, 351/162

[56] References Cited

U.S. PATENT DOCUMENTS

| | | | |
|---|---|---|---|
| 3,415,597 | 12/1968 | Harman | 351/161 |
| 3,597,055 | 8/1971 | Neefe | 351/161 |
| 3,984,506 | 10/1976 | Tsuetaki | 351/161 |
| 4,162,122 | 7/1979 | Cohen | 351/161 |
| 4,302,081 | 11/1981 | Tsuetaki | 351/161 |
| 4,477,158 | 10/1984 | Pollock et al. | 351/161 |
| 4,573,775 | 3/1986 | Bayshore | 351/161 |
| 4,605,524 | 8/1986 | Danker | 351/161 |
| 4,614,413 | 9/1986 | Obssuth | 351/161 |
| 4,618,228 | 10/1986 | Baron et al. | 351/161 |
| 4,636,049 | 1/1987 | Blaker | 351/161 |
| 4,637,697 | 1/1987 | Freeman | 351/161 |
| 4,693,572 | 9/1987 | Tsuetaki et al. | 351/161 |
| 4,704,016 | 11/1987 | de Carle | 351/161 |
| 4,752,123 | 6/1988 | Blaker | 351/161 |

FOREIGN PATENT DOCUMENTS

| | | | |
|---|---|---|---|
| 201231 | 11/1986 | European Pat. Off. | 351/161 |
| 3222099 | 12/1983 | Fed. Rep. of Germany | 351/161 |

*Primary Examiner*—Scott J. Sugarman
*Attorney, Agent, or Firm*—Henry D. Coleman; R. Neil Sudol

[57] ABSTRACT

In monovision type corneal contact lenses, one or both lenses is provided with one or more auxiliary correction zones each having a focal length different from the focal length of the major portion of the respective lenses. In any lens in accordance with the invention, the portion of the principal correction zones coextensive with the pupil of the respective eye covers more than approximately two-thirds (more preferably seventy-five percent and most preferably eighty percent) of the area of the pupil. This upper limit on the pupil area covered by the auxiliary zones is satisfied regardless of the disposition of the respective contact lens on the eye and regardless of the size of the respective pupil.

26 Claims, 5 Drawing Sheets

MONOVISION CORNEAL CONTACT LENSES

BACKGROUND OF THE INVENTION

This invention relates to corneal contact lenses and more particularly to monovision type corneal contact lenses.

Presbyopia is a condition of advancing age caused by a hardening of the natural crystalline lenses of the eyes. The hardening results in a resistance of the lenses to changes in surface curvature, thereby usually rendering effective near vision impossible without corrective lenses. Conventional contact lens correction for presbyopia includes contact lens equivalents of traditional spectacle bifocals: each contact lens is divided into a D-shaped upper area adapted for distance vision and a D-shaped lower area adapted for near vision. Other conventional contact lens corrections for presbyopia may take the form of annular, aspheric or diffractive lenses.

Traditional bifocal eyeglasses are effective for everyday use because the eyeglasses sit in a fixed position on the wearer's nose. To change from distant vision to near vision or vice versa, the wearer merely shifts which portions of the lenses through which the eyes are looking. The shift may be effectuated either by a rotation of the eyes or by a tilting of the head, or both.

When the same geometric configuration is used in contact lenses, the bifocal correction is not entirely effective because a contact lens slides relative to an eye surface. Upon a rotation of the eye in its socket, the lens may encounter an eyelid, which moves the lens relative to the eye and particularly relative to the pupil.

Other configurations of the correction zones in bifocal contact lenses also suffer from a shifting of the contact lenses relative to the respective eye surfaces. In all conventional bifocal contact lenses, shifting causes blurring and a concomitant success rate of only about 25%. The highest success rate attainable for bifocal or multifocal contact lenses is at most 35%.

The low success rate of conventional multifocal corneal contact lenses also arises from changes in pupil size. Because the diameter of the pupil changes with variations in ambient lighting conditions, and because of the shifting of the lens with respect to the corneal surface, the relative amounts of light falling on the retina through the different correction zones of a multifocal lens differ under different light conditions. The differences aggravate the problems exhibited by multifocal contact lenses.

Generally, multifocal contact lenses (usually either bifocal or trifocal lenses) not of a segmented configuration are of a concentric configuration. In a conventional bifocal contact lens of the concentric type, a first, centrally located, circular correction zone constitutes a distant vision correction zone and is defined by a relatively long focal length, while a second annular correction zone surrounding the first zone is a near vision correction zone and has a relatively short focal length.

A trifocal contact lens is provided with a third correction zone having a focal length with a value lying between the distant vision focal length and the near vision focal length. The third correction zone may be termed a middle or an intermediate distance correction zone.

A common problem with conventional multifocal contact lenses is that a portion of the actual perceived image is always out of focus. Such a situation occurs during night driving when the pupil is open to a maximum or near maximum diameter and light enters the eye through both the central correction zone and the annular correction zone of a concentric contact lens. This results in a large blur circle and concomitant difficulties for the driver. Theoretically, the user's brain is capable of ignoring the blurry portion of the image in favor of the focused portion However, this rejecting of the out-of-focus portion does not always occur.

An alternative type of contact lens for correcting presbyopia is the monovision lens. A monovision lens is designed to focus only near objects or far objects on the retina. Thus, a patient provided with a distant vision contact lens for one eye (usually the dominant eye) and a near vision contact lens for the other eye uses the one eye to distinguish objects at a distance (for example, while driving) and the other eye for near vision (for example, reading). Although patients using monovision contact lenses are not seeing stereoscopically, typically visual tasks can be better performed with monovision lenses than with bifocal contact lenses. In addition, monovision lenses have a 75% success rate, much higher than the 25-35% success rate of conventional bifocal contact lenses. Despite the superior performance of monovision type contact lenses, they suffer from the disadvantage that the consuming public finds the loss of stereoscopic vision to be undesirable.

OBJECTS OF THE INVENTION

An object of the present invention is to provide improved corneal contact lenses for the correction of presbyopia.

A more particular object of the present invention is to provide improved monovision type corneal contact lenses.

Another particular object of the present invention is to provide such monovision type contact lenses which avoid the above-mentioned disadvantage.

SUMMARY OF THE INVENTION

In accordance with a general embodiment of the present invention, a pair of corneal contact lenses comprises a first contact lens for one eye of a patient, that lens having a first distant vision correction zone and a second distant vision correction zone separated from one another by an auxiliary correction zone. The distant vision correction zones have a common focal length, while the auxiliary correction zone has another focal length different from the distant vision correction zone focal length. A second contact lens, for the other eye of the patient, has a first near vision correction zone and a second near vision correction zone separated from one another by another auxiliary correction zone. The near vision correction zones of the second contact lens have their own common focal length, while the auxiliary correction zone of the second contact lens has a focal length different from the focal length of the near vision correction zones of the second lens.

Preferably, the auxiliary correction zones of the two contact lenses are intermediate distance correction zones. In some applications, it may be preferable that the auxiliary correction zone of the first lens is an intermediate-distant vision correction zone, while the auxiliary correction zone of the other lens is an intermediate-near vision correction zone. In such cases, the focal length of an auxiliary correction zone is closer than it would otherwise be to the focal length of the other correction zones of the respective lens.

As described hereinafter, the auxiliary correction zones are limited in size relative to the principal correction zones of the respective lenses. In this way, the advantages of monovision are retained, while additional benefits are provided by virtue of the inclusion of the auxiliary correction zones.

In some applications, it is advantageous that the focal lengths of the auxiliary correction zones of the two lenses are in essentially the same focal range.

Pursuant to an alternative specific feature of the present invention, the auxiliary correction zone of the first lens is a near vision correction zone. Alternatively, the auxiliary correction zone of the second lens is a distant vision correction zone. In either of these cases, the focal length of an auxiliary correction zone is closer than it would otherwise be to the focal length of the non-auxiliary correction zones of the other lens. Specifically, the auxiliary correction zone of the first lens may be a near vision correction zone with a focal length in a range in which the focal length of the near vision correction zones of the second lens falls. Similarly, the auxiliary correction zone of the second lens may be a distant vision correction zone.

The distant vision correction zones of the first lens and the near vision correction zones of the second lens may have any of a number of different geometric configurations. For example, the correction zones may be concentrically arranged or may take D shapes (segmented lenses). More particularly, the first distant vision correction zone (first lens) may occupy a circular area and the second distant vision correction zone (first lens) may occupy an annular area surrounding the distant vision correction zone, the auxiliary correction zone of the first contact lens occupying an essentially annular area between the two distant vision correction zones. Likewise, the first near vision correction zone (second lens) may occupy a circular area, while the second near vision correction zone occupies an annular area about the second near vision correction zone and the auxiliary correction zone of the second lens takes an annular form between the two near vision correction zones.

In a particular embodiment of the invention, each concentrically configured lens may be provided with a plurality of annular auxiliary distance correction zones between the circular inner zone and the annular outer zone. One of the auxiliary correction zones in the first lens may take the form of an intermediate-distant vision correction zone, while another auxiliary correction zone may take the form of a true intermediate distance correction zone or a near vision correction zone. In that case, the focal length of the intermediate distance correction zone is shorter than the focal length of the intermediate-distant vision correction zone which is, in turn, smaller than the focal length of the distant vision correction zones. Similarly, in the second lens, one auxiliary correction zone may be a true intermediate distance correction zone, while another auxiliary correction zone is an intermediate-near vision correction zone or even an intermediate-distant vision correction zone.

Pursuant to yet another feature of the present invention, the centrally located, circular correction zone of a concentrically configured lens, whether it is a distant vision correction zone or a near vision correction zone, has an area equal to approximately two-thirds of a minimum area subtended by the respective pupil of the patient. In addition, in a lens having three zones or more, where the outermost annular zone has essentially the same focal length as the inner, circular correction zone, it is advantageous that the inner correction zone and the portion of the outermost annular correction zone coextensive with the pupil in a maximally opened state thereof together occupy an area equal to at least two thirds of the area of the respective pupil in the maximally opened state thereof.

With respect to a specific form of the present invention, the distant vision correction zones of the first lens and the near vision correction zones of the second lens are all essentially D-shaped in a plan view of the two contact lenses. In that case, the auxiliary correction zones of the two lenses are essentially strip-shaped. One or more additional strip-shaped auxiliary correction zones may be disposed in each lens between the distant vision correction zones (first lens) or the near vision correction zones (second lens) thereof. One of the plurality of auxiliary correction zones may be an intermediate distance correction zone, while another auxiliary correction zone is, for example, a distant vision correction zone, a near vision correction zone, an intermediate-distant vision correction zone or an intermediate-near vision correction zone. Preferably, an auxiliary correction zone of one contact lens has a focal length in the same focal range (e.g., distant, intermediate-distant, intermediate, intermediate-near, near) as a corresponding auxiliary correction zone of the other contact lens.

In accordance with another general embodiment of the present invention, a pair of monovision type corneal contact lenses comprises a distant vision contact lens for one eye of a patient, the lens having a distant vision correction zone extending throughout a major portion of the lens. The distant vision correction zone has a characteristic focal length. The lens also has at least one first auxiliary correction zone with a respective focal length different from the focal length of the distant vision correction zone. The portion of the distant vision correction zone coextensive with the pupil of the one eye covers more than approximately two-thirds (more preferably 75% and most preferably 80%) of the area of the pupil of the one eye, essentially irrespective of the disposition of the contact lens on the eye and of size of the pupil. A near vision contact lens for the other eye of the patient has a near vision correction zone extending throughout a major portion of the near vision lens. The near vision correction zone has a characteristic focal length. The near vision lens, in addition, has at least one auxiliary correction zone with a focal length different from the focal length of the near vision portion of the lens. The portion of the auxiliary correction zone of the near vision lens coextensive with the pupil of the respective eye covers more than approximately two-thirds (more preferably 75% and most preferably 80%) of the area of that pupil, essentially irrespective of the disposition of the near vision contact lens on the eye and of the size of the respective pupil.

Pursuant to this general embodiment of the invention, the light falling on the retina of either eye through the auxiliary correction zone or zones of the respective contact lens is limited at any and all times to one-third (more preferably 25% and most preferably 20%) of the total incident radiation.

Pursuant to a specific feature of the invention, the auxiliary correction zone or zones of one lens of a monovision pair correspond substantially in size, shape and location to the auxiliary correction zone or zones of the other member of the pair. The auxiliary correction zones may be, for example, annular, crescent shaped, or rectangular. They may both be intermediate distance vision correction zones.

An advantage of monovision type contact lenses in accordance with the present invention is that they may be marketed as bifocal or even trifocal lenses. That makes the lenses more desirable than conventional monovision lenses to the consuming public. The benefits of monovision are retained, while the user is able to see stereoscopically in at least a limited (e.g., intermediate distance) focal range.

A corneal contact lens pursuant to a general feature of the present invention has a first vision correction zone with a first focal length and at least one second vision correction zone with a second focal length different from the first focal length. The lens has on an anterior side a continuous surface with essentially a single radius of curvature and is provided on a posterior side with a cornea matching surface extending annularly along a periphery of the lens. The posterior side is further formed with at least one concave surface having a radius of curvature smaller than any radius of curvature of the cornea matching surface, the concave surface being spaced from a geometric center of the lens.

DETAILED DESCRIPTION

Figure 1:
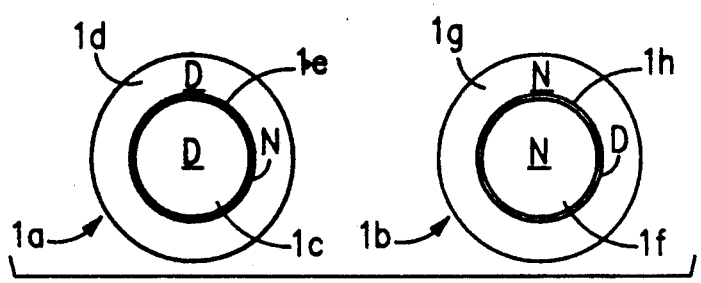
FIG. 1 is a plan view of a pair of contact lenses in accordance with a first general embodiment of the present invention.

All of the drawings in this application illustrate pairs of corneal contact lenses with members having multiple correction zones which differ in configuration from one to the other to provide a modified monovision correction for presbyopia. One member of each pair is intended for one eye of a patient, while the other member is intended for the other eye.

FIGS. 1 through 10 all illustrate multifocal contact lenses wherein one lens has two distant vision correction zones of essentially the same focal length separated by another, auxiliary correction zone of a different focal length. The other contact lens has two near vision correction zones of essentially a common focal length separated by another, auxiliary correction zone of a focal length different from the common focal length of the two near vision correction zones.

It is to be noted that, for purposes of simplifying the drawing, the plan views of FIGS. 1 through 14 and 19 through 25 have omitted a representation of an annular peripheral cornea matching zone included in each lens pursuant to conventional lens design. These corneal matching areas are shown in the cross-sectional views of FIGS. 15 through 18.

FIG. 1 shows a distant vision contact lens 1a and a near vision contact lens 1b. Lens 1a has a circular distant vision (D) correction zone 1c preferably, but not necessarily, located at the geometric center of the lens and an annular distant vision correction zone 1d at the outer periphery of the lens. Distant vision correction zones 1c and 1d have the same focal length and are separated by a near vision (N) correction zone 1e. Lens 1b has a circular, innermost near vision correction zone 1f and an annular, outermost near vision correction zone 1g of a common focal length, separated by a distant vision correction zone 1h.

Figure 2:
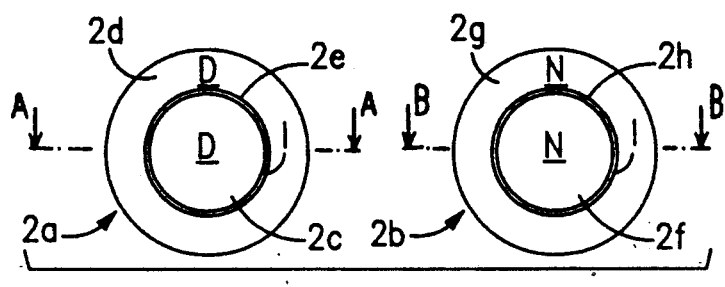
FIGS. 2 through 10 are plan views of further pairs of contact lenses in accordance with a first general embodiment of the present invention.

FIG. 2 also shows a distant vision contact lens 2a and a near vision contact lens 2b. Lens 2a has a circular distant vision correction zone 2c preferably, but not necessarily, located at the geometric center of the lens and an annular distant vision correction zone 2d at the outer periphery of the lens. Distant vision correction zones 2c and 2d have the same focal length and are separated by an intermediate distance correction zone 2e. The other lens 2b has a circular, innermost near vision correction zone 2f and an annular, outermost near vision correction zone 2g of a common focal length, separated by an auxiliary correction zone in the form of an annular intermediate distance correction zone 2h.

Figure 3:
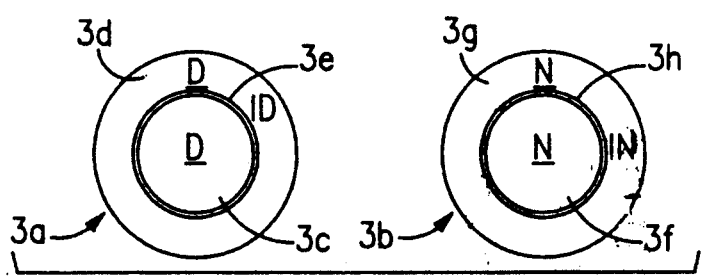

As depicted in FIG. 3, a first contact lens 3a includes a circular innermost correction zone 3c and an annular outer correction zone 3d separated by an annular auxiliary correction zone 3e. Correction zones 3c and 3d are distant vision correction zones, while middle zone 3e is an intermediate-distant vision (ID) correction zone with a focal length which would be longer than the focal length of an intermediate distance correction zone 2e (FIG. 2) for the same eye of the same patient. Accordingly, the focal length of intermediate-distant correction zone 3e can be considered closer to the focal length of zones 3c and 3d than the focal length of intermediate distance correction zone 2e is to the focal length of zones 2c and 2d.

The other contact lens 3b of the pair of FIG. 3 includes a circular innermost correction zone 3f and an annular outer correction zone 3g separated by an annular auxiliary correction zone 3h. Correction zones 3f and 3g are near vision correction zones, while middle zone 3h is an intermediate-near vision (IN) correction zone with a focal length which would be shorter than the focal length of an intermediate distance correction zone 2h (FIG. 2) for the same eye of the same patient. Thus, the focal length of intermediate-near vision correction zone 3h is generally closer to the focal length of zones 3f and 3g than the focal length of intermediate distance correction zone 2h is to the focal length of zones 2f and 2g.

Preferably, the inner, circular correction zones 1c, 1f, 2c, 2f and 3c, 3f of the lenses shown in FIGS. 1 through 3 each have an area equal to approximately two-thirds of a minimum area subtended by the respective pupil of the patient. This area distribution is believed to optimally minimize blurring during periods of high illumination.

During periods of low illumination (e.g., night driving), visual acuity in distant vision contact lens 1a, 2a or 3a is ensurable, provided that the respective inner distant vision correction zone 1c, 2c or 3c of each lens 1a, 2a or 3a and a portion of the respective outer distant vision correction zone 1d, 2d or 3d coextensive with the pupil of the respective eye in a maximally opened state of such pupil together cover an area equal approximately to at least two-thirds of the area subtended by the pupil in the maximally opened state. Similarly, visual acuity may be maximized in the near vision contact lenses 1b, 2b and 3b, provided that the respective inner near vision correction zone 1f, 2f or 3f and a portion of the respective outer near vision correction zone 1g, 2g or 3g coextensive with the pupil of the respective eye in a maximally opened state of such pupil together also covers an area equal approximately to at least two-thirds of a maximum area subtended by the respective pupil in its maximally opened state.

It is to be noted that each distant vision contact lens 1a, 2a and 3a may be viewed as having a single distant vision correction zone interrupted by a narrow annular auxiliary correction zone 1e, 2e or 3e. Similarly, each near vision contact lens 1b, 2b and 3b may be viewed as having a single near vision correction zone interrupted by a narrow annular auxiliary correction zone 1h, 2h or 3h. The center circular zone of each lens 1a, 2a, 3a, 1b, 2b and 3b may have a diameter (in plan view of the respective lens) between 6 and 8 millimeters, an annular middle correction zone 1e, 2e, 3e, 1h, 2h or 3h approximately three-quarters of a millimeter in width, and an annular outer correction zone 1d, 2d, 3d, 1g, 2g or 3g on the order of two millimeters in width. In addition, each contact lens has an annular outer periphery or skirt (not illustrated in any of the plan views, but see FIGS. 15 through 18) having no corrective function, but serving to seat the respective lens on the corneal surface.

Figure 4:
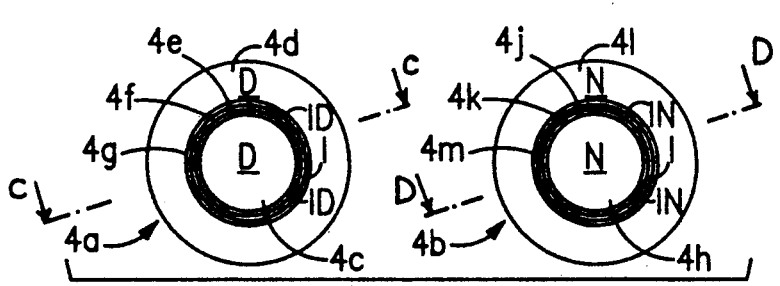

As illustrated in FIG. 4, one contact lens 4a has a circular innermost correction zone 4c separated from an annular outermost correction zone 4d by three annular middle correction zones 4e, 4f and 4g. Innermost and outermost zones 4c and 4d are distant vision correction zones, while annular middle zones 4e and 4g are intermediate-distant vision correction zones and middle zone 4f is a true intermediate distance correction zone. Thus, the focal length of middle zone 4f is generally shorter than the focal length of middle zones 4e and 4g.

Similarly, second contact lens 4b of the pair shown in FIG. 4 has a circular innermost correction zone 4h separated from an annular outermost correction zone 4i by three annular middle correction zones 4j, 4k and 4m. Innermost and outermost zones 4h and 4i are near vision correction zones, while annular middle zones 4j and 4m are intermediate-near vision correction zones and middle zone 4k is a true intermediate distance correction zone, the focal length of middle zone 4k being longer than the focal length of middle zones 4j and 4m.

Intermediate-distant vision correction zones 4e and 4g of contact lens 4a have a first common focal length, and intermediate-near vision correction zones 4j and 4m of contact lens 4b have a second common focal length. Preferably, the middle correction zones 4e, 4f, 4g, 4j, 4k and 4m have a radial dimension or width substantially thinner than the radial dimension of outer correction zones 4d and 4i or the radii of inner correction zones 4c and 4h. The magnitudes of the focal lengths of intermediate distance correction zones 4f and 4k depend, like the focal lengths of the other zones of the two contact lenses, on the prescription requirements of the individual patient. Thus, the focal lengths of the various distance correction zones, for example, the intermediate distance correction zones or the distant vision correction zones, will be the same for the two eyes only if the eyes require the same focal correction in the intermediate and long distance ranges.

Figure 5:
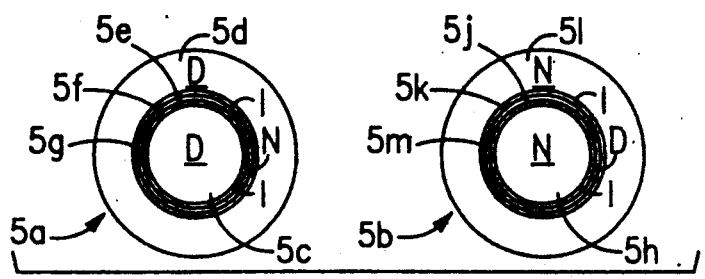

As illustrated in FIG. 5, one contact lens 5a has a circular innermost correction zone 5c separated from an annular outermost correction zone 5d by three annular middle correction zones 5e, 5f and 5g. Innermost and outermost zones 5c and 5d are distant vision correction zones, while annular middle zones 5e and 5g are intermediate distance correction zones and middle zone 5f is a near vision correction zone.

Similarly, second contact lens 5b of the pair shown in FIG. 5 has a circular innermost correction zone 5h separated from an annular outermost correction zone 5i by three annular middle correction zones 5j, 5k and 5m. Innermost and outermost zones 5h and 5i are near vision correction zones, while annular middle zones 5j and 5m are intermediate distance correction zones and middle zone 5k is a distant vision correction zone. The focal length of middle zone 5k may or may not be substantially equal to the focal length of distant vision correction zones 5c and 5d of lens 5a, depending on the corrections required for the patient's eyes.

Generally, intermediate distance correction zones 5e and 5g have a first common focal length, intermediate distance correction zone 5j and 5m have a second common focal length, distant vision correction zones 5c and 5d have a third common focal length, and near vision correction zones 5h and 5i have a fourth common focal length. In addition, near vision correction zones 5f and 5k have their own respective focal lengths. Preferably, to minimize blurring and therefore optimize visual acuity, the middle correction zones 5e, 5f, 5g, 5j, 5k and 5m have a radial dimension or width substantially thinner than the radial dimension of outer correction zones 5d and 5i or the radii of inner correction zones 5c and 5h.

Figure 6:
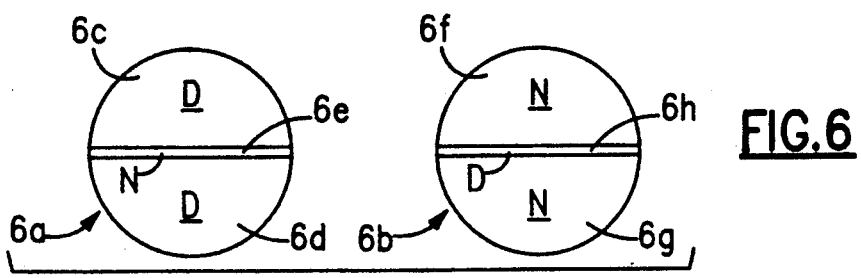

As depicted in FIG. 6, another pair of contact lenses includes a first lens 6a with two D-shaped distant vision correction zones 6c and 6d separated by a strip-shaped near vision correction zone 6e. A second lens 6b comprises two D-shaped near vision correction zones 6f and 6g separated by a strip-shaped distant vision correction zone 6h.

Figure 7:
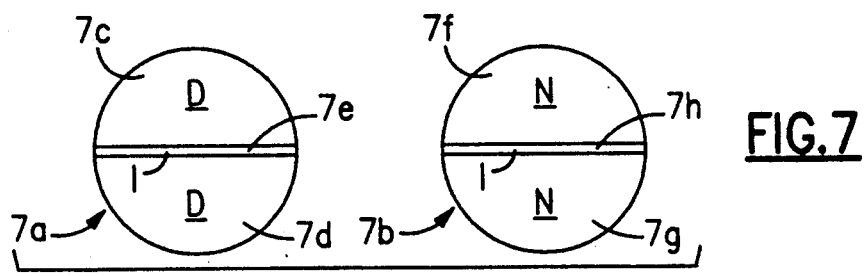

As shown in FIG. 7, yet another pair of contact lenses includes a first lens 7a with two D-shaped distant vision correction zones 7c and 7d separated by a strip-shaped intermediate distance correction zone 7e. A second lens 7b comprises two D-shaped near vision correction zones 7f and 7g separated by a strip-shaped intermediate distance correction zone 7h. Distant vision correction zones 7c and 7d have a common focal length and near vision correction zones 7f and 7g also have a common focal length.

Figure 8:
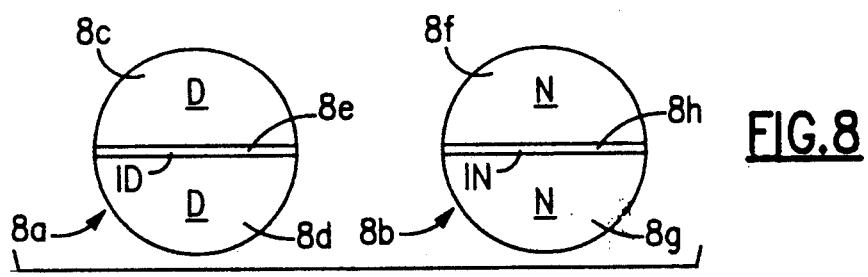

FIG. 8 illustrates two contact lenses 8a and 8b having D-shaped distant vision correction zones 8c and 8d, D-shaped near vision correction zones 8f and 8g, a strip-shaped intermediate-distant vision correction zone 8e between D-shaped zones 8c and 8d, and a strip-shaped intermediate-near vision correction zone 8h between D-shaped zones 8f and 8g. As described hereinabove, the focal lengths of intermediate-distant vision correction zone 8e and intermediate-near vision correction zone 8h are respectively longer and shorter than the focal length of a true intermediate distance correction zone would be and accordingly are closer in value to the focal lengths of distant vision correction zones 8c and 8d and near vision correction zones 8f and 8g, respectively.

Figure 9:
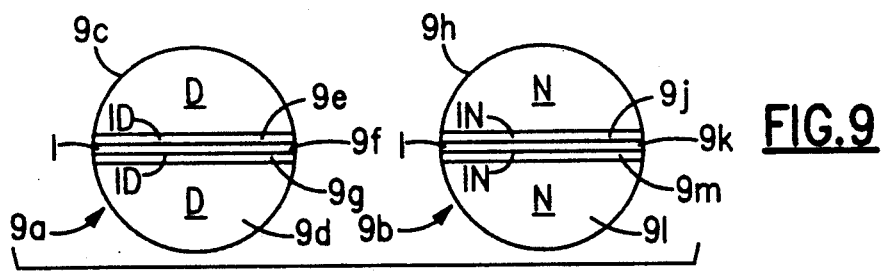

FIG. 9 is an illustration of a first contact lens 9a having two substantially D-shaped correction zones 9c and 9d and three substantially strip-shaped correction zones 9e, 9f and 9g between D-shaped zones 9c and 9d. A second contact lens of the pair includes two substantially D-shaped correction zones 9h and 9i and three substantially strip-shaped correction zones 9j, 9k and 9m between D-shaped zones 9h and 9i.

Zones 9e and 9g are intermediate-distant vision correction zones, while zones 9j and 9m are intermediate-near vision correction zones. Middle zones 9f and 9k are intermediate distance correction zones. Middle zone 9f has a focal length less in value than a focal length of intermediate-distant vision correction zones 9e and 9g, while middle zone 9k has a focal length greater in value than a common focal length of intermediate-near vision correction zones 9j and 9m. Accordingly, the preferably identical focal lengths of intermediate-distant vision correction zones 9e and 9g are closer in value than the focal length of intermediate distance correction zone 9f to the preferably common focal lengths of distant vision correction zones 9c and 9d. Similarly, the preferably identical focal lengths of intermediate-near vision correction zones 9j and 9m are closer in value than the focal length of intermediate distance correction zone 9k to the preferably common focal lengths of near vision correction zones 9h and 9i.

Figure 10:
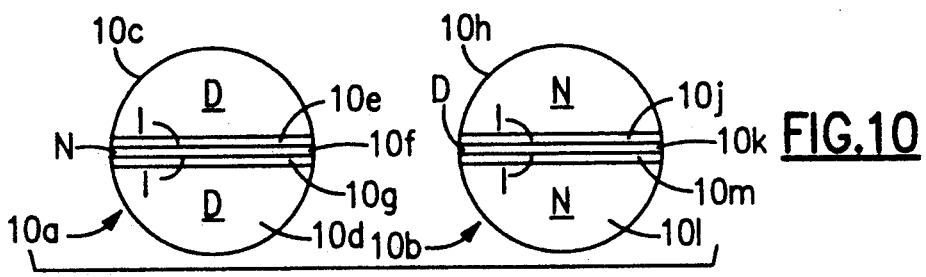

FIG. 10 shows a corneal contact lens pair including a first lens 10a having two substantially D-shaped correction zones 10c and 10d and three substantially strip-shaped correction zones 10e, 10f and 10g between D-shaped zones 10c and 10d. A second lens of the pair includes two substantially D-shaped correction zones 10h and 10i and three substantially strip-shaped correction zones 10j, 10k and 10m between D-shaped zones 10h and 10i.

Zones 10e and 10g are all intermediate distance correction zones having the same focal length. Likewise, zones 10j and 10m are intermediate distance correction zones having a common focal length. Middle zones 10f and 10k constitute a near vision correction zone and a distant vision correction zone, respectively.

Figure 11:
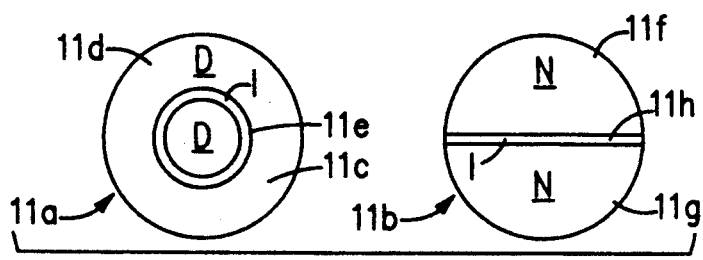
FIG. 11 is a plan view of another pair of contact lenses in accordance with the present invention.

As depicted in FIG. 11, a first contact lens 11a of a pair of multifocal corneal contact lenses includes three correction zones 11c, 11d and 11e arranged in a concentric configuration. Innermost correction zone 11c is a circular distant vision correction zone, while outer zone 11d is an annular distant vision correction zone. Zone 11e is an annular intermediate distance correction zone separating the two distant vision correction zones 11c and 11d. The second contact lens 11b of the pair shown in FIG. 11 includes two D-shaped correction zones 11f and 11g flanking a substantially strip-shaped middle correction zone 11h. D-shaped zones 11f and 11g are near vision correction zones, while middle zone 11h is an intermediate distance correction zone. Zones 11e and 11h have essentially respective focal lengths which may be more or less equal to one another, depending on the prescriptions of a patient's eyes. Distant vision correction zones 11c and 11d have a common focal length larger in value than the focal length of intermediate distance correction zone 11e. Likewise, near vision correction zones 11f and 11g have the same focal length which is less than the focal length of intermediate distance correction zone 11h.

Figure 12:
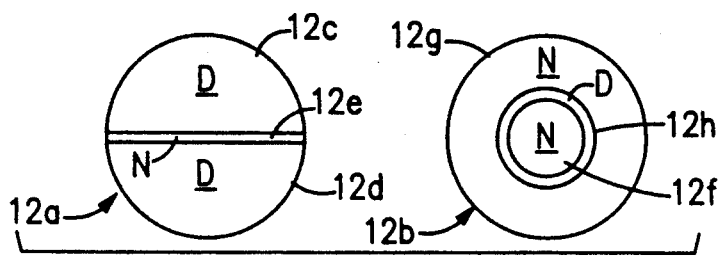
FIG. 12 is a plan view of yet another pair of contact lenses in accordance with the present invention.

As depicted in FIG. 12, a first contact lens 12a of a pair of multifocal corneal contact lenses includes two D-shaped correction zones 12c and 12d flanking a substantially strip-shaped middle correction zone 12e. D-shaped zones 12c and 12d are distant vision correction zones, while middle zone 12e is a near vision correction zone. Preferably, zones 12c and 12d have essentially the same focal length.

The second contact lens 12b of the pair shown in FIG. 12 includes three correction zones 12f, 12g and 12h arranged in a concentric configuration. Innermost correction zone 12f is a circular near vision correction zone, while outer zone 12h is an annular near vision correction zone. Zone 12g is an annular distant vision correction zone separating the two near vision correction zones 12f and 12h.

Figure 13:
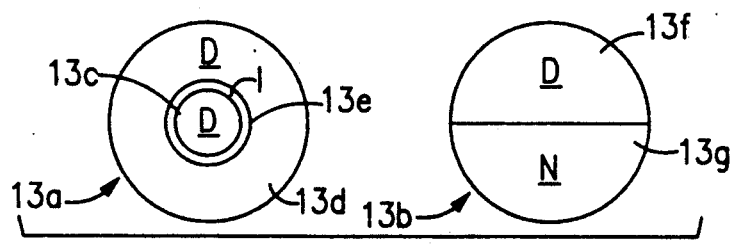
FIG. 13 is a plan view of yet another pair of contact lenses in accordance with the present invention.

FIG. 13 is a rendering of a pair of multifocal corneal contact lenses 13a and 13b identical to lens 2a and 19a, respectively. Accordingly, lens 13a has a circular distant vision correction zone 13c preferably, but not necessarily, located at the geometric center of the lens and an annular distant vision correction zone 13d at the outer periphery of the lens. Distant vision correction zones 13c and 13d have the same focal length and are separated by an intermediate distance correction zone 13e. In addition, lens 13b has a D-shaped distant vision correction zone 13f disposed above a D-shaped near vision correction zone 27g.

Figure 14:
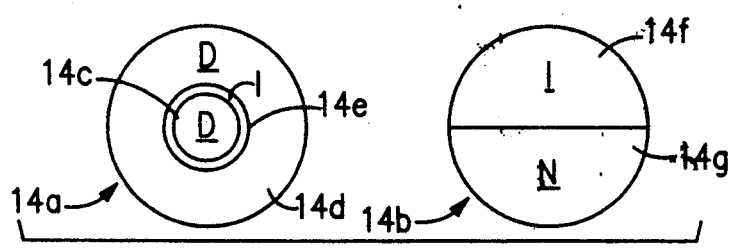
FIG. 14 is a plan view of another pair of contact lenses in accordance with the present invention.

FIG. 14 shows a distant vision contact lens 14a and a near vision contact lens 14b. Lens 14a has a circular distant vision correction zone 14c preferably, but not necessarily, located at the geometric center of the lens and an annular distant vision correction zone 14d at the outer periphery of the lens. Distant vision correction zones 14c and 14d have the same focal length and are separated by an intermediate distance correction zone 14e. The other lens 14b includes a pair of D-shaped correction zones 14f and 14g. Upper zone 14f is an intermediate distance correction zone, while lower correction zone 14g is a near vision correction zone.

The contact lenses of the instant invention can be made of any conventional contact lens material. Such materials are polymeric compositions including, but not limited to, soft lens and hard lens materials, gas permeable polymers, and, more particularly, ethyl methacrylates and silicone acrylates.

The contact lenses of the instant invention are manufactured preferably by a molding technique, optionally with subsequent machining and polishing, to form recesses on the posterior (cornea facing) sides of the lenses for producing the various correction zones.

Figure 15:
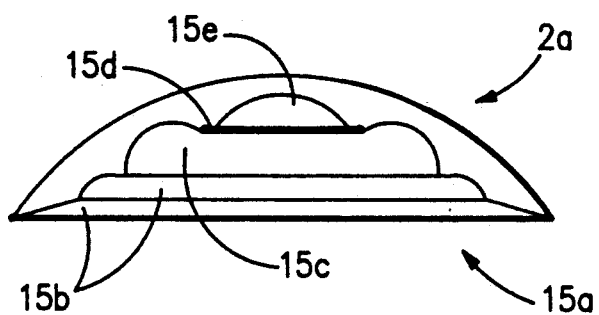
FIG. 15 is a cross-sectional view taken along line A—A in FIG. 2.

As illustrated in FIG. 15, lens 2a of FIG. 2 may be provided on a posterior side 15a with an annular cornea matching peripheral surface 15b, a first annular concave surface 15c, a second annular concave surface 15d, and a substantially hemispherical or circular concave surface 15e. Surfaces 15c, 15d and 15e correspond to distant vision correction zone 2d, intermediate distance correction zone 2e and distant vision correction zone 2c of lens 2a, respectively. The radii of curvature of surfaces 15c and 15e are essentially equal, while the radius of curvature of middle concave surface 15d is greater than the radius of curvature of surfaces 15c and 15e. The radii of curvature of the vision correction zone surfaces 15c, 15d and 15e are all less than the radius (or radii) of curvature of cornea matching surface(s) 15b. The radii of curvature are predetermined so that, together with a tear reservoir which will be formed between the lens and the eye surface upon application of the lens to the eye, the particular prescription of a patient is satisfied.

Alternatively, the recess defined by concave surfaces 15c, 15d and 15e may be filled with an appropriate gas permeable synthetic resin material. In that case, the radii of curvature of the surfaces 15c, 15d and 15e is modified to achieve the same prescription.

Figure 16:
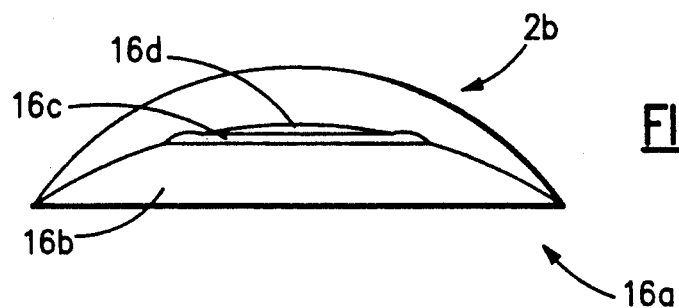
FIG. 16 is a cross-sectional view taken along line B—B in FIG. 2.

Similarly, as depicted in FIG. 16, lens 2b may be provided on a posterior side 16a with an annular cornea matching peripheral surface 16b, an annular concave surface 16c and a circular, inner concave surface 16d. Surface 16c corresponds to intermediate distance correction zone 2h (FIG. 2) and has a radius of curvature which is smaller than the radius of curvature of inner concave surface 16d, which corresponds to near vision correction zone 2c, and smaller than the radius of curvature of cornea matching surface 16b.

Figure 17:
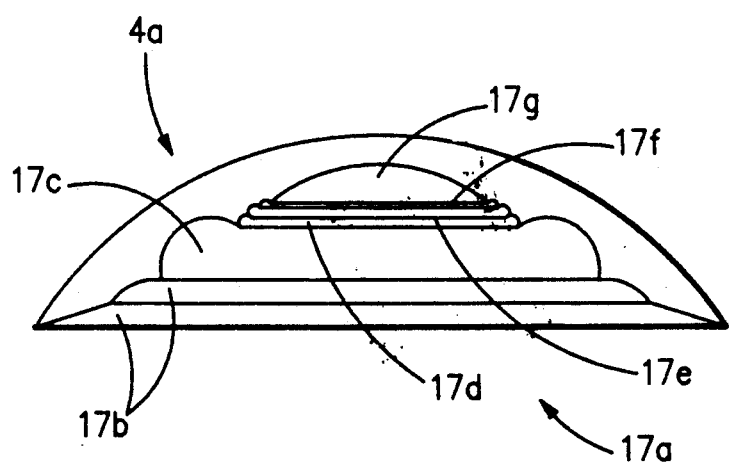
FIG. 17 is a cross-sectional view taken along line C—C in FIG. 4.

As shown in FIG. 17, lens 4a may be provided on a posterior side 17a with an annular cornea matching peripheral surface 17b, a first annular concave surface 17c, a second annular concave surface 17d, a third annular concave surface 17e, a fourth annular concave surface 17f and a circular, inner concave surface 17g. Surfaces 17c, 17d, 17e, 17f and 17g respectively correspond to distant vision correction zone 4d, intermediate-distant vision correction zone 4g, intermediate distance correction zone 4f, intermediate-distant vision correction zone 4e and distant vision correction zone 4c of lens 4a. Surfaces 17c and 17g have a common radius of curvature smaller than a common radius of curvature of surfaces 17d and 17f, which in turn is smaller than a radius of curvature defining surface 17e. The radii of curvature of all the correction zone surfaces 17c through 17g are smaller than the radii of curvature of cornea matching surface(s) 17b. As set forth hereinabove, the radii of curvature of surfaces 17c through 17g will change if the recess defined by the surfaces is filled with one or several gas permeable synthetic resin materials.

Figure 18:
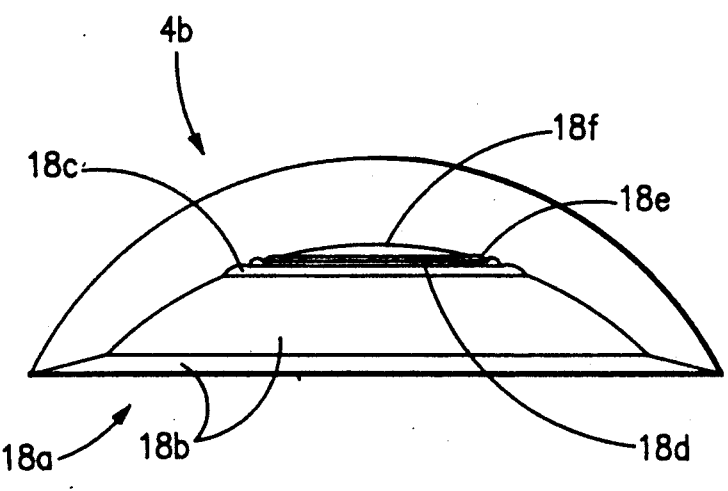
FIG. 18 is a cross-sectional view taken along line D—D in FIG. 4.

As shown in FIG. 18, contact lens 4b may be provided on a posterior side 18a with an annular cornea matching peripheral surface 18b, a first annular concave surface 18c, a second annular concave surface 18d, a third annular concave surface 18e, and a circular, inner concave surface 18f. Surfaces 18c, 18d, 18e and 18f correspond to intermediate-near vision correction zone 4m, intermediate distance correction zone 4k, intermediate-near vision correction zone 4j and near vision correction zone 4h, respectively. Surfaces 18c and 18e have a common radius of curvature larger than a radius of curvature of surface 17d and smaller than a radius of curvature of surface 18f. The radius of curvature of surface 18f equals the radius of curvature of an inner annular portion of cornea matching surface 18b which corresponds to near vision correction zone 4i. The radii of curvature of surfaces 18c through 18f will change if the recess defined by the surfaces is filled with one or several gas permeable synthetic resin materials.

Figure 19:
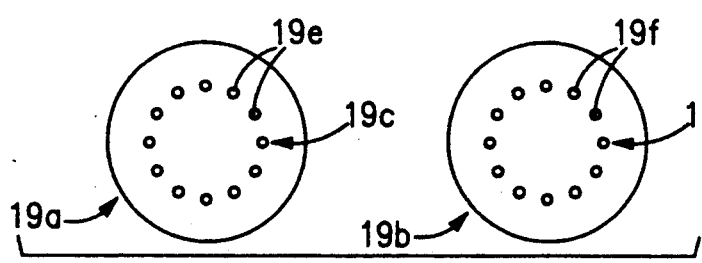
FIGS. 19 through 23 are plan views of additional pairs of contact lenses in accordance with another general embodiment of the present invention.

As illustrated in FIG. 19, a pair of monovision type corneal contact lenses including a distant vision contact lens 19a and a near vision contact lens 19b in accordance with the present invention may be provided with respective circular arrays 19c and 19d of small circular correction zones 19e and 19f having one or more focal lengths different from a characteristic focal length of the major portion of the respective lens. For example, circular zones 19e and 19f may all constitute intermediate distance correction zones having a common focal length. Alternatively, circular zones 19e of lens 19a may be intermediate-distant vision correction zones, while circular correction zones 19f may be near vision correction zones. In accordance with yet another alternative, only some of the small circular zones of each lens may be intermediate distance correction zones. In that case, the other small circular zones in lens 19a may be near vision correction zones or intermediate-distant vision correction zones, while the other small circular zones in lens 19b may be distant vision correction zones or intermediate-near vision correction zones.

Figure 20:
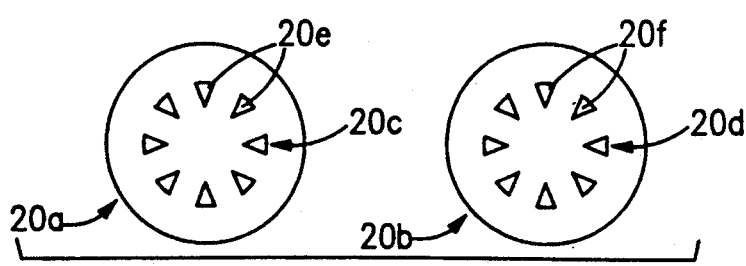

A pair of monovision type corneal contact lenses, illustrated in FIG. 20, including a distant vision contact lens 20a and a near vision contact lens 20b in accordance with the present invention may be provided with respective circular arrays 20c and 20d of small triangular correction zones 20e and 20f having one or more focal lengths different from a characteristic focal length of the major portion of the respective lens. For example, triangular zones 20e and 20f may all constitute intermediate distance correction zones having a common focal length.

Alternatively, triangular zones 20e of lens 20a may be intermediate-distant vision correction zones, while triangular correction zones 20f may be near vision correction zones. If only some of the small triangular zones of each lens are intermediate distance correction zones, the other small triangular zones in lens 20a may be near vision correction zones or intermediate-distant vision correction zones, while the other small triangular zones in lens 20b may be distant vision correction zones or intermediate-near vision correction zones.

Figure 21:
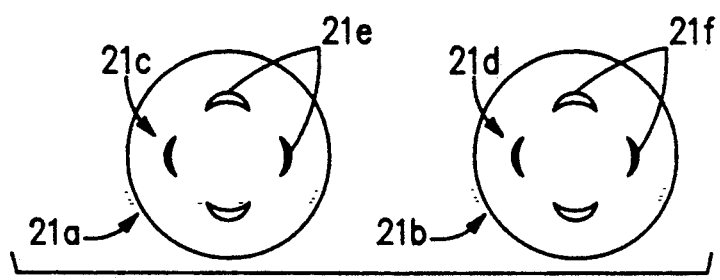

FIG. 21 depicts a distant vision contact lens 21a and a near vision contact lens 21b in accordance with the present invention. Lenses 21a and 21b may be provided with respective substantially circular arrays 21c and 21d of small crescent-shaped correction zones 21e and 21f having one or more focal lengths different from a characteristic focal length of the major portion of the respective lens. For example, crescent-shaped zones 21e and 21f may all constitute intermediate distance correction zones having a common focal length. Alternatively, crescent-shaped zones 21e of lens 21a may be intermediate-distant vision correction zones, while crescent-shaped correction zones 21f may be near vision correction zones. In accordance with yet another alternative, only some of the small crescent-shaped zones of each lens may be intermediate distance correction zones. In that case, the other small crescent-shaped zones in lens 21a may be near vision correction zones or intermediate-distant vision correction zones, while the other small crescent-shaped zones in lens 21b may be distant vision correction zones or intermediate-near vision correction zones.

Figure 22:
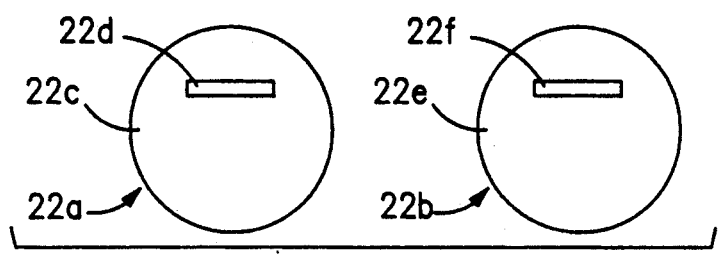

As shown in FIG. 22, a distant vision lens 22a of a pair of monovision corneal contact lenses includes a major portion 22c with a distant vision corrective focal length, and a narrow, horizontally oriented correction zone 22d of a focal length different from the focal length of the major portion of the lens. A second lens 22b has a major portion 22e of a near vision focal length. The near vision lens is further provided with a narrow strip-shaped correction zone 22f oriented horizontally and having a focal length different from the focal length of the major portion of the near vision lens. Both strip-shaped auxiliary correction zones 22d and 22f are disposed above a horizontal center line of the respective lenses. Alternatively, both could be disposed below the center line. Correction zones 22d and 22f may both be intermediate distance correction zones. Or zone 22d may be an intermediate-distant vision correction zone or a near vision correction zone. Similarly, zone 22f could be an intermediate-near vision correction zone or a distant vision correction zone.

Figure 23:
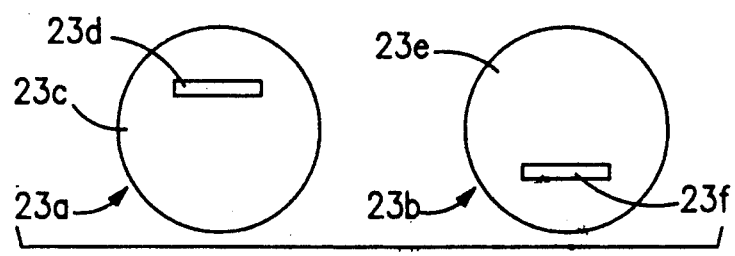

FIG. 23 shows another pair of monovision type corneal contact lenses. A distant vision contact lens 23a is identical to lens 22a and thus includes a major portion 23c with a distant vision corrective focal length, and a narrow, horizontally oriented correction zone 23d of a focal length different from the focal length of the major portion of the lens. A near vision lens 23b has a major portion 23e of a near vision focal length. The near vision lens is further provided with a narrow strip-shaped correction zone 23f oriented horizontally and having a focal length different from the focal length of the major portion of the near vision lens. Strip-shaped auxiliary correction zone 23d is disposed above a horizontal center line of the respective lens 23a, while strip-shaped zone 23f is disposed below the horizontal axis of symmetry of lens 23b. Correction zones 23d and 23f may both be intermediate distance correction zones. Or zone 23d may be an intermediate-distant vision correction zone or a near vision correction zone. Similarly, zone 23f could be an intermediate-near vision correction zone or a distant vision correction zone.

Figure 24:
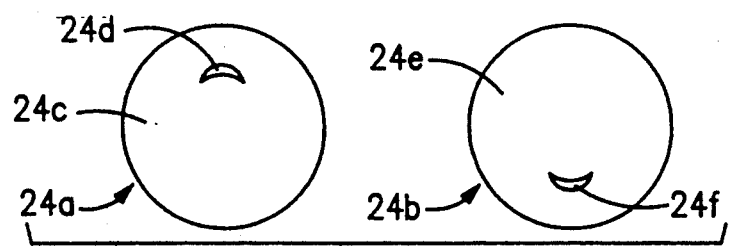
FIGS. 24 and 25 are plan views of contact lenses in accordance with yet another general embodiment of the present invention.

FIG. 24 illustrates yet another pair of monovision type corneal contact lenses. A distant vision contact lens 24a includes a major portion 24c with a distant vision corrective focal length, and a thin, crescent-shaped substantially horizontally oriented correction zone 24d of a focal length different from the focal length of the major portion of the lens. A near vision lens 24b has a major portion 24e of a near vision focal length. The near vision lens is further provided with a thin crescent-shaped correction zone 24f oriented horizontally and having a focal length different from the focal length of the major portion of the near vision lens. Auxiliary correction zone 24d is disposed above a horizontal center line of the respective lens 24a, while zone 24f is disposed below the horizontal axis of symmetry of lens 24b. Correction zones 24d and 24f may both be intermediate distance correction zones. Or zone 24d may be an intermediate-distant vision correction zone or a near vision correction zone. Similarly, zone 24f could be an intermediate-near vision correction zone or a distant vision correction zone.

Figure 25:
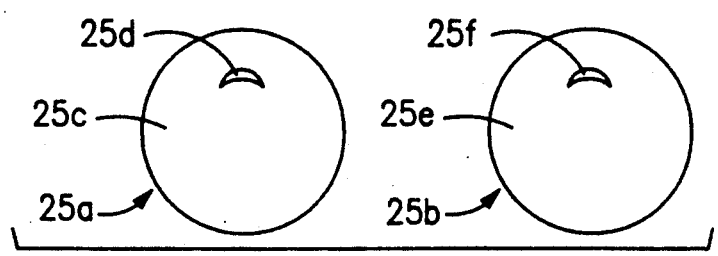

FIG. 25 shows two monovision lenses 25a and 25b with major correction zones 25c and 25e, respectively, and crescent-shaped auxiliary correction zones 25d and 25f having locations, sizes and orientations similar to the locations, sizes and orientations of zones 22d and 22f in FIG. 22.

It is to be noted that the essential feature of all the monovision lenses illustrated in FIGS. 19 through 25 and of other lenses described herein is that the portion of the principal correction zone or zones (either distant vision or near vision correction) coextensive with the pupil of the respective eye covers more than approximately two-thirds (more preferably seventy-five percent and most preferably eighty percent) of the area of the pupil. The concomitant upper limit (33%, 25%, 20%) on the pupil area covered by the auxiliary zones is satisfied regardless of the disposition of the respective contact lens on the eye and regardless of the size of the respective pupil. This proportionate coverage of the pupil minimizes blurring, while enabling auxiliary vision correction (usually intermediate) in each substantially monovision contact lens.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proferred by way of example to facilitate comprehension of the invention and should not be construed to limit the scope thereof.

What is claimed is:

1. A pair of corneal contact lenses, comprising:
    a first contact lens for one eye of a patient, said lens having a first distant vision correction zone and a second distant vision correction zone separated from one another by a first auxiliary correction zone, said first distant correction zone and said second distant vision correction zone having a first common focal length, said auxiliary correction zone having a first additional focal length different from said common focal length; and
    a second contact lens for the other eye of the patient, said second contact lens having a first near vision correction zone and a second near vision correction zone separated from one another by a second auxiliary correction zone, said first distant correction zone and said second distant vision correction zone having a second common focal length, said second auxiliary correction zone having a second additional focal length different from said second common focal length.

2. The pair of contact lenses defined in claim 1 wherein said first auxiliary correction zone and said second auxiliary correction zone are intermediate distance correction zones.

3. The pair of contact lenses defined in claim 1 wherein said first distant vision correction zone, said second distant vision correction zone and said first auxiliary correction zone are concentric with each other and wherein said first near vision correction zone, said second near vision correction zone and said second auxiliary correction zone are concentric with each other.

4. The pair of contact lenses defined in claim 3 wherein said first distant vision correction zone and said first near vision correction zone each have an area equal to approximately two-thirds of a minimum area subtended by the respective pupil of the patient.

5. The pair of contact lenses defined in claim 3 wherein said first distant vision correction zone and a portion of said second distant vision correction zone coextensive with the pupil of the respective eye in a maximally opened state of such pupil together cover an area equal approximately to at least two-thirds of the area subtended by the pupil in said maximally opened state, said first near vision correction zone and a portion of said second near vision correction zone coextensive with the pupil of the respective eye in a maximally opened state of such pupil together also covering an area equal approximately to at least two-thirds of a maximum area subtended by the respective pupil in its maximally opened state.

6. The pair of contact lenses defined in claim 3 wherein said first auxiliary correction zone and said second auxiliary correction zone are intermediate distance correction zones.

7. The pair of contact lenses defined in claim 3 wherein said first auxiliary correction zone is a near vision correction zone, and said second auxiliary correction zone is a distant vision correction zone.

8. The pair of contact lenses defined in claim 3 wherein said first auxiliary correction zone is an intermediate-distant vision correction zone and said second auxiliary correction zone is an intermediate-near vision correction zone.

9. The pair of contact lenses defined in claim 1 wherein said first distant vision correction zone, said second distant vision correction zone, said first near vision correction zone and said second near vision correction zone are all essentially D-shaped in plan view of said first contact lens and said second contact lens, respectively, said first auxiliary correction zone and said second auxiliary correction zone being essentially strip shaped in plan view of said first contact lens and said second contact lens.

10. The pair of contact lenses defined in claim 5 wherein said first auxiliary correction zone and said second auxiliary correction zone are intermediate distance correction zones.

11. The pair of contact lenses defined in claim 5 wherein said first auxiliary correction zone is a near vision correction zone, and said second auxiliary correction zone is a distant vision correction zone.

12. A pair of corneal contact lenses, comprising:
a first contact lens for one eye of a patient, said lens having a circular first correction zone, an annular second correction zone disposed concentrically around said first correction zone and an annular third correction zone concentrically disposed around said second correction zone, said first correction zone and said third correction zone having a common focal length, said second correction zone having a focal length different from said common focal length; and
a second contact lens for the other eye of the patient, said second contact lens having a fourth correction zone and a fifth correction zone, at least one of said fourth correction zone and said fifth correction zone being D shaped in a plan view of said second contact lens, one of said first correction zone and said one of said fourth correction zone and said fifth correction zone constituting a distant vision correction zone and the other of said first correction zone and said one of said fourth correction zone and said fifth correction zone constituting a near vision correction zone.

13. A pair of monovision type corneal contact lenses, comprising:
a distant vision contact lens for one eye of a patient, said lens having a distant vision correction zone extending throughout a major portion of said lens, said distant vision correction zone having a first focal length, said lens having at least one first auxiliary correction zone with a second focal length different from said first focal length, a portion of said distant vision correction zone coextensive with the pupil of said one eye covering more than approximately two-thirds of the area of the pupil of said one eye in essentially any operative disposition of said contact lens on said eye and with essentially any size of said pupil; and
a near vision contact lens for the other eye of the patient, said lens having a near vision correction zone extending throughout a major portion of said lens, said near vision correction zone having a third focal length, said lens having at least one second auxiliary correction zone with a fourth focal length different from said third focal length, a portion of said near vision correction zone coextensive with the pupil of said other eye covering more than approximately two-thirds of the area of the pupil of said other eye in essentially any operative disposition of said contact lens on said other eye and with essentially any size of the pupil of said other eye.

14. The pair of contact lenses defined in claim 13 wherein a portion of said distant vision correction zone coextensive with the pupil of said one eye covers more than approximately seventy-five percent of the area of the pupil of said one eye in essentially any operative disposition of said contact lens on said eye and with essentially any size of the pupil of said one eye, and wherein a portion of said near vision correction zone coextensive with the pupil of said other eye covers more than approximately seventy-five percent of the area of the pupil of said other eye in essentially any operative disposition of said contact lens on said other eye and with essentially any size of the pupil of said other eye.

15. The pair of contact lenses defined in claim 13 wherein said second auxiliary correction zone corresponds substantially in size, shape and location to said first auxiliary correction zone.

16. The pair of contact lenses defined in claim 13 wherein said first auxiliary correction zone and said second auxiliary correction zone are both annular.

17. The pair of contact lenses defined in claim 13 wherein said first auxiliary correction zone and said second auxiliary correction zone are both intermediate distance vision correction zones.

18. A corneal contact lens having a first vision correction zone with a first focal length and at least one second vision correction zone with a second focal length different from said first focal length, the lens having on an anterior side a continuous surface with essentially a single radius of curvature, the lens being provided on a posterior side with a cornea matching surface extending annularly along a periphery of said lens, said posterior side being further formed with a first concave surface having a first radius of curvature smaller than any radius of curvature of said cornea matching surface, said concave surface being radially spaced from a geometric center of said lens, said posterior side being formed with a second concave surface spaced from said cornea matching surface and having a second radius of curvature different from said first radius of curvature.

19. The contact lens defined in claim 18 wherein said first concave surface is annular.

20. The contact lens defined in claim 19 wherein said first concave surface corresponds to an intermediate distance correction zone of the lens.

21. The contact lens defined in claim 20 wherein the lens is a near vision contact lens and said second concave surface takes the form of a circular, concave inner area, said second radius of curvature being larger than said first radius of curvature.

22. The contact lens defined in claim 20 wherein the lens is a distant vision contact lens and said second concave surface takes the form of a circular, concave inner area, said second radius of curvature being smaller than said first radius of curvature.

23. The contact lens defined in claim 18 wherein said first concave surface is spaced from said cornea matching surface.

24. A pair of corneal contact lenses, comprising:
a first contact lens for one eye of a patient, said lens having a circular distant vision correction zone and an annular first auxiliary correction zone surrounding said distant vision correction zone, said distant vision correction zone having a first focal length, said auxiliary correction zone having a second focal length different from said first focal length; and
a second contact lens for the other eye of the patient, said second contact lens having a circular near vision correction zone and an annular second auxiliary correction zone surrounding said near vision correction zone, said near vision correction zone having a third focal length, said second auxiliary correction zone having a fourth focal length different from said third focal length, one of said first contact lens and said second contact lens having an annular third auxiliary correction zone surrounding the respective one of said first auxiliary correction zone and said second auxiliary correction zone, said third auxiliary correction zone having a focal length substantially the same as the focal length of the circular correction zone of said one of said said first contact lens and said second contact lens.

25. The pair of contact lenses defined in claim 24 wherein said first auxiliary correction zone and said second auxiliary correction zone are intermediate distance correction zones.

26. The pair of contact lenses defined in claim 25 wherein said third auxiliary correction zone is a near vision correction zone and said one of said said first contact lens and said second contact lens constitutes said second contact lens.

* * * * *